United States Patent [19]

Hall et al.

[11] 4,208,828

[45] Jun. 24, 1980

[54] ROACH TRAP

[76] Inventors: H. Hedley Hall, 98-38 57th Ave., Rego Park, N.Y. 11368; George Spector, 3615 Woolworth Building, 233 Broadway, New York, N.Y. 10007

[21] Appl. No.: 846,810

[22] Filed: Oct. 31, 1977

[51] Int. Cl.² ............................................. A01M 1/14
[52] U.S. Cl. ........................................ 43/114; 43/121
[58] Field of Search ................. 43/114, 115, 116, 121, 43/136, 131, 61, 69

[56] References Cited

U.S. PATENT DOCUMENTS

| 1,000,368 | 8/1911 | Borkenaagen | 43/121 |
| 1,250,007 | 12/1917 | Phillips | 43/121 |
| 1,999,342 | 4/1935 | Reynolds | 43/121 |
| 2,433,919 | 1/1948 | Mitchell | 43/69 |
| 2,932,836 | 12/1960 | Hughes | 43/58 |
| 3,913,259 | 10/1975 | Nishimura | 43/121 |

*Primary Examiner*—Nicholas P. Godici

[57] ABSTRACT

A roach trap that uses the physiology of the insect to entice the insect to a location where it is destroyed, the trap including a closed box with bait therein having a fanlight entrance at one end accessible by an inclined ramp, an enclosed tubular passage inside the box extending inwardly from the entrance so roaches can enter, said passage having a horizontal floor and tapering in size toward an open end whereby the roaches fall upon a sticky gummed paper where they die, including a close fitting access door at the opposite end of the box for removing and replacing the gummed paper, wherein the roof of the passage way extends beyond the floor whereby the roaches are enticed to move over the open end by feeling the roof with their antennae.

7 Claims, 5 Drawing Figures

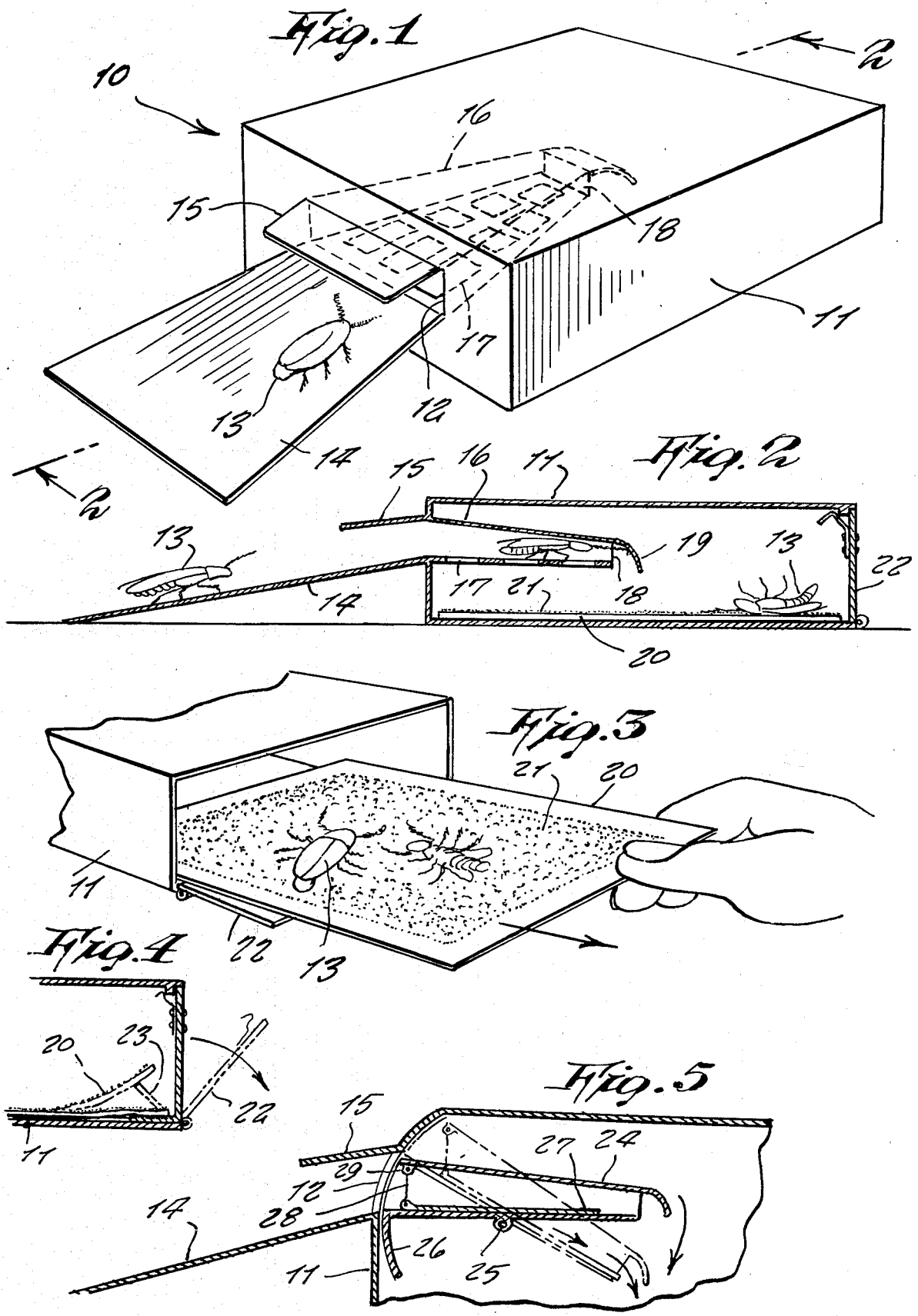

ROACH TRAP

This invention relates generally to traps used for destroying objectionable insects. More specifically, it relates to a roach destroying trap, which uses the instincts and physiology of the roach to cause its entrapment and destruction.

A principal object of the present invention is to provide a small trap that can be unobtrusively placed within confined areas frequented by roaches such as behind refrigerators, under sinks, corners of closets and shelves, and the like and lured to a location for destruction.

Another object is to provide a roach trap which gives off no unpleasant odors because it employs no chemicals, uses natural foods to attract roaches, and destroys them, keeps the bodies in place so that they are not found scattered about the area, the trap being easily cleaned out by removing the destroyed roaches, and then reused.

Yet another object is to provide a roach trap which is convient, and simple for use by anyone to control roaches in a home.

Other objects are to provide a roach trap which is simple in design, inexpensive to manufacture, rugged in construction, easy to handle and efficient in operation.

These and other objects will be readily understood after a study of the following specifications and the accompanying drawing, where:

FIG. 1 is a perspective view of the invention shown in use.

FIG. 2 is a cross section on line 2—2 of FIG. 1.

FIG. 3 illustrates removal of the sticky paper as it becomes necessary.

FIG. 4 shows a design in which the entry channel is pivotally upset by the weight of a roach after crossing over the pivot point to tilt the channel for faster dumping of the roaches; the channel also includes a floor which automatically slides longitudinally when the channel is tilted to more rapidly move toward the fall-off point of the channel.

Refering now to the drawing in greater detail, and more particularly to FIGS. 1 to 3 thereof at this time, reference numeral 10 represents a roach catching trap according to the present invention wherein there is a small box 11 having an entry 12 high up on one side so that roaches 13 climbing up an exterior, inclined ramp 14 can enter the box. An exterior extending canopy 15 is above the entry.

Inside the box, an inwardly tapered tube 16 with a horizontal floor, extends from the entry point inwardly wherein the floor of the tube has cut-out holes 17 so that roaches entering the box either fall through the holes 17 or continue into the tube to an end opening 18, enticed by the bait placed in the box. The bait comprises natural foods. Processed foods, such as butter, margarine and skins of fruits, etc., are not to be used.

As shown in FIG. 2, the roof of the tube is reduced in height so that the antennae of the insects maintain contact with the roof giving false information regarding the existence of floor support ahead whereby the roaches continue forward falling through holes 17 or through opening 18 while feeling canopy 19 with their antennae.

Inside the box, a paper sheet 20 rests upon the box floor, the paper being coated with sticky gum 21 in which the insect gets caught, cannot escape and is destroyed thereby. A door 22 hinged at the opposite end of the box permits the removal of the gummed paper after being filled with roaches, and the paper is replaced by a new gummed paper so as to continue use of the trap.

In FIG. 4, a modified construction shows an inward flange 23 rigidly secured to the door 22 for extending under an edge of the gummed paper so as to lift the same when the door is opened, and thus allows easy grasp of the paper for removal therefrom.

In FIG. 5, another design of the invention includes a tube 24 inside the box which is pivotable about a pin 25 that in a normal "set" position it aligns with the entry 12 so a roach can enter it, but which tilts downwardly when the roach reaches an inner end of the tube, beyond the pivot pin. This causes a more rapid effective deposition of the roaches upon the gummed paper. A curved shield 26 may be provided at the inner end to seal the entrance when the tube is in a tilted position, preventing roaches from escaping.

A movable floor 27 inside the tube is suspended at one end from a cord 28 attached to eyelet 29 on the tube ceiling, so that when the tube is tilted, the floor then slides downwardly a short distance toward the inner open end of the tube to aid in moving the roaches more rapidly towards the open end of the tube to deposit them on the gummed paper.

It should be further noted that canopy 15 aids in enticing the roaches into the tube by providing a feeler surface in front of the roaches for contact with their antennae providing them with a sense of security in moving forward.

This device has been used extensively in practice with great success.

While various changes may be made in the detail construction, it is understood that such changes will be within the spirit and scope of the present invention as in defined by the appended Claims.

What is claimed is:

1. A roach catching trap, comprising in combination, a box having a raised entrance at one end, an external ramp leading to said entrance, a passageway tube inside said box aligned with said entrance, said tube including an inner end opening overlying a sticky removable surface on the floor of said box including a rear end of said box having an access door for replacing said sticky surface, said tube including a roof within reach of the roachs' antennae having a downward sloping overhang extending beyond said opening.

2. A trap as in claim 1, wherein said tube includes a floor with spaced holes.

3. A trap as in claim 2, wherein said tube is generally horizontal.

4. A trap as in claim 1, wherein said door includes means for raising said sticky surface upon opening said door.

5. A trap as in claim 1, wherein said tube is pivotally mounted in said box whereby said tube pivots downward upon said roaches reaching a preselected location.

6. A trap as in claim 1, including means for suddenly moving said roaches towards said opening responsive to said roaches reaching a preselected location in said tube including a barrier movable to close said entrance responsive to actuation of said means.

7. A trap as in claim 6, wherein said means comprise said tube being pivotally mounted in said box, including a slidable floor which moves towards said opening responsive to pivotal motion of said tube, wherein said barrier is secured to said tube.

* * * * *